United States Patent [19]

Bizer et al.

[11] Patent Number: 4,707,929
[45] Date of Patent: Nov. 24, 1987

[54] INSTRUMENT FOR DETERMINING THE SETTING OF A LENS EDGER DEVICE TO PRODUCE A PROPERLY SIZED LENS

[76] Inventors: Jerry L. Bizer; Raymond D. Carrig, Jr., both of 516 E. Hwy. 131, Clarksville, Ind. 47130

[21] Appl. No.: 58,767

[22] Filed: Jun. 5, 1987

[51] Int. Cl.⁴ ............................................... G01B 5/00
[52] U.S. Cl. ......................................... 33/507; 33/200
[58] Field of Search ............................ 33/507, 28, 200

[56] References Cited

U.S. PATENT DOCUMENTS 3,457,652  7/1969  Moffett ............................. 33/507 X
4,625,418 12/1986  Joncour et al. .................. 33/507 X Primary Examiner—Harry N. Haroian
Attorney, Agent, or Firm—Charles G. Lamb

[57] ABSTRACT

An instrument for use in optical laboratories for indicating the setting of a lens edger device based upon the relationship between a lens pattern or dummy lens and the lens opening of a spectacle frame into which a finished lens is to fit. The instrument can be used to determine the lens edger setting to produce a finished lens to fit both rimmed spectacle frames and rimless spectacle frames. The instrument gauges the size of the spectacle frame lens opening in relationship to either the lens pattern in the event of fitting a lens to rimmed spectacle frames, or a dummy lens in the event of fitting a lens to rimless spectacle frames.

6 Claims, 4 Drawing Figures

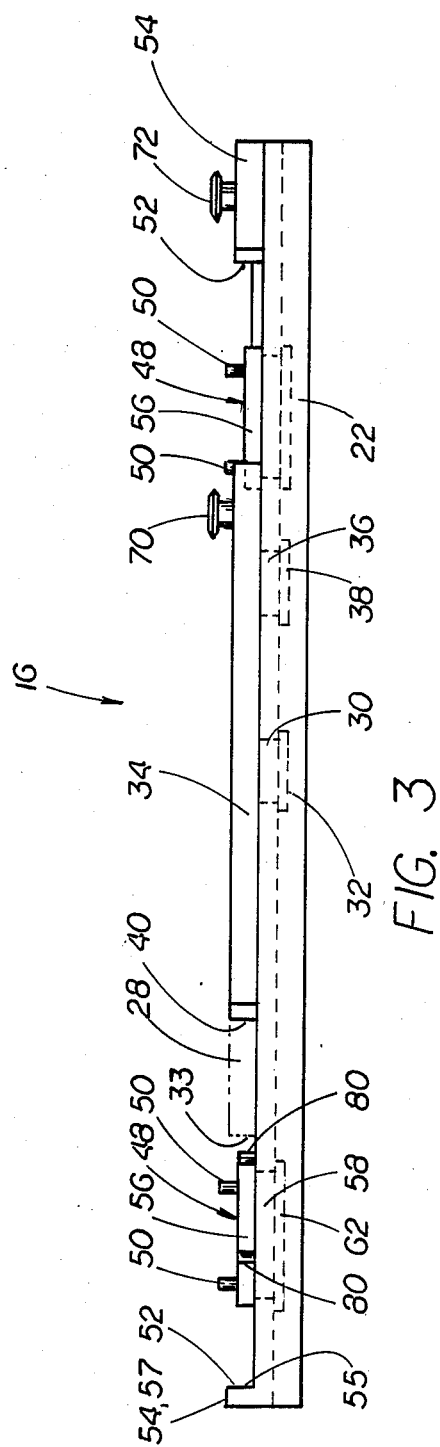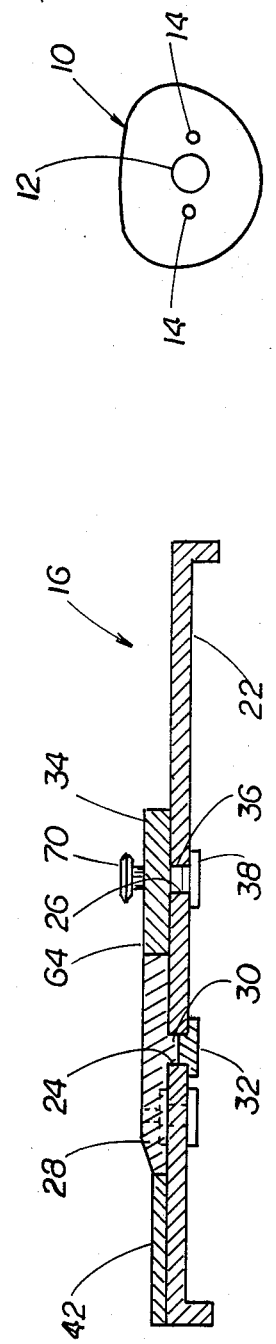

INSTRUMENT FOR DETERMINING THE SETTING OF A LENS EDGER DEVICE TO PRODUCE A PROPERLY SIZED LENS

BACKGROUND OF THE INVENTION

The present invention relates to apparatus for the preparation of lenses for eyeglasses prior to the edge shaping of the lenses, and more particularly to a device for determining the setting of a lens edger device.

The manufacturers of spectacle frames also provide lens patterns having a peripheral configuration corresponding to the peripheral configuration of the lens to be mounted in the spectacle frame. However, these lens patterns are not necessarily of the proper peripheral dimension to fit the lens openings of the spectacle frame. Lens patterns are typically used in conjunction with a lens edger device as a template to guide the lens edger device for forming a lens which is of the proper peripheral configuration to fit the lens opening of spectacle frames. The lens edger must be adjusted or set in order to form a lens which is of the proper peripheral size to fit the frame lens opening. Thus, the peripheral size of the lens opening of the spectacle frame must be determined in relationship to the lens pattern so that the lens edge device can be set to make a lens of the proper peripheral size and configuration.

A number of devices have been proposed for accomplishing this task.

One example of a device for indicating the set size for a lens edger device required to edge grind the lens to fit the lens opening of a spectacle frame is shown in U.S. Pat. No. 3,457,652 issued on July 29, 1969 to Robert L. Moffett. The device includes two parallel sides mounted on a base, the top slide having a lens pattern abutment plate at one end and an index mark. The bottom slide has a scale along one edge and a spectacle lens opening engagement pin attached thereto. The base has a lens pattern abutment adjacent the end of the top slide having the lens pattern abutment, and a spectacle lens opening engagement pin in alignment with a lens opening engagement pin on the bottom slide. A lens pattern is positioned adjacent to the top slide between the lens pattern abutment on the top slide and lens pattern abutment on the base and the top slide is moved toward the lens pattern until both lens pattern abutments are in contact with opposite sides of the lens pattern. A spectacle frame is positioned at one end of the bottom slide with the lens opening abutment pins in diametrically opposed engagement with a lens opening of the spectacle frame. The index on the top slide then cooperates with the scale on the bottom slide to indicate the set size reading of the bevel edger required to produce a lens to fit the spectacle lens opening.

The above described device cannot be used to determine the lens edger device setting required for making lenses for rimless spectacles. In addition, the above described device has no provision in checking the accuracy of lens pattern before it is used to determine the setting of the lens edger device.

SUMMARY OF THE INVENTION

It is an object of the present invention to provide an instrument for determining the setting of a lens edger device for making finished lens for both rimmed and rimless spectacles.

It is a further object of the present invention to provide for the checking of the accuracy of the lens pattern.

More particularly, the present invention provides an instrument for determining the setting of a lens edger device based upon the relationship between a lens pattern and the lens opening of a spectacle frame or a dummy lens comprising a base member, a first slide having two transverse ends slidably mounted to the base member for linear movement in both longitudinal directions of the first slide member, lens pattern abutments located on each transverse end of the first slide member, a first scale on the base member adjacent to and extending along the linear path of movement of the first slide member, the first scale being centered on the transverse center of the path of movement of the first scale, means for locating and retaining a lens pattern at each end of the first slide member with the longest horizontal dimension of the lens pattern parallel with the path of movement of the first slide member, lens pattern abutment means on the base member located at each end of the path of movement of the first slide member and spaced to the opposite side of the lens pattern locating and retaining means from the corresponding transverse end of the first slide member, a second slide member slidably mounted to the base member for linear movement in both longitudinal directions of the second slide member along a path of movement parallel to the path of movement of the first slide member, a dummy lens abutment located on one transverse end of the second slide member, spectacle frame lens opening engaging means at the other transverse end of the second slide member for engaging the spectacle frame at one end of the diamer of the lens opening, spectacle frame lens opening engaging means on the base member for engaging the spectacle frame at the other end of the diameter of the lens opening, dummy lens abutment means on the base member located at the one end of the path of movement of the second slide member adjacent the dummy lens abutment at the one transverse end of the second slide member, a second scale on the second slide member adjacent to and extending along the linear path of movement of the second slide member, the second scale being centered on the transverse center of the second slide member, and index means on the first slide member for registering with the first scale to indicate the longest horizontal dimension of the lens pattern positioned at the lens pattern locating and retaining means at either end of the first slide member and for also registering with the scale on the second slide member to indicate the proper setting of the lens edger device to produce a lens to fit the spectacle frame openings corresponding in peripheral shape to the lens pattern.

BRIEF DESCRIPTION OF THE DRAWING

A better understanding of the invention an its advantages will be had upon reference to the following description in conjunction with the accompanying drawings in which like numerals refer to like parts throughout the several views and wherein:

FIG. 1 is a plan view of a typical lens pattern;

FIG. 3 is a side view of the instrument as seen in the direction of arrows 3—3 in FIG. 2; and, FIG. 4 is a cross-sectional view of the instrument as seen in the direction of arrows 4—4 in FIG. 2.

DETAILED DESCRIPTION OF THE PREFERRED EMBODIMENT

Figure 2:
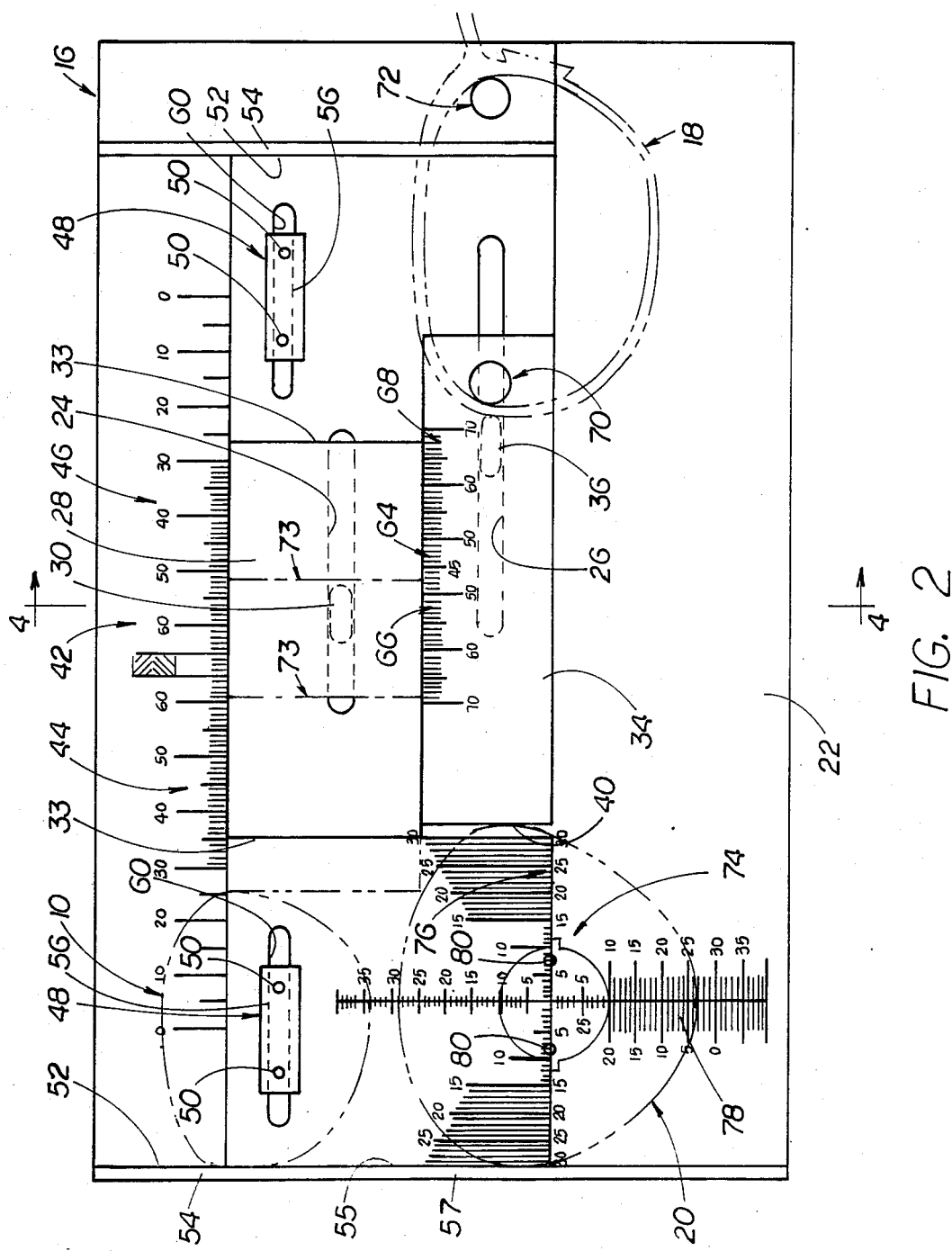
FIG. 2 is a plan view of the instrument of the present invention.

First with reference to FIG. 1, there is shown a lens pattern 10 of the type commercially available and typically used in the manufacture of spectacle lens. The lens pattern 10 is used in a conventional lens edger device (not shown) in a manner well known in the art to guide the grinding or cutting wheel of the edger device so as to duplicate the peripheral configuration of the lens pattern 10 to the finished lens being edged by the edger device. Typically lens patterns 10 include a centered through bore 12 to receive the arbor of the edger device and two small apertures 14 spaced equal distance to either side of the through bore 12 for receiving locating pins of the edger device. The locating apertures 14 are on the horizontal centerline of the lens pattern 10.

Now turning to FIGS. 2 through 4, there is shown the instrument 16 for determining the setting of a lens edger device based upon the relationship between a lens pattern 10 (shown in phantom lines in FIG. 2) and either the lens opening of a spectacle frame 18 (shown in phantom lines in FIG. 2) or a dummy lens 20 (shown in phantom lines in FIG. 2) as will be hereinafter explained.

The instrument 16 includes a base member 22 having a first elongated slot 24 formed therein and a second elongated slot 26 formed therein substantially parallel to and spaced apart from the first elongated slot 24.

A first slide member 28 is positioned on the top surface of the base member 22 over the first slot 24 and has a depending pin 30 which is received in the first slot 24. The depending pin 30 has an enlarged head 32 which abuts the bottom surface of the base member 22 to retain the pin 30 in the first slot 24. The first slide member 28 is thusly slideably mounted to the base member 22 for linear movement in both longitudinal directions of the first slide member 28 along the path of the longitudinal axis of the elongated first slot 24. The first slide member 28 has a lens pattern abutment 33 located at each end of the first slide member 28. As shown, the lens pattern abutments 33 are formed by the transverse ends of the first slide member 28.

A second slide member 34 is positioned on the top surface of the base member 22 over the second elongated slot 26 and has depending pin 36 which is received in the second elongated slot 26. The depending pin 36 has an enlarged head 38 which abuts the bottom side of the base member 22 to retain the pin 36 in the second slot 26. The second slide member 34 is thusly slideably mounted to the base member 22 for linear movement in both longitudinal directions of the second slide member 34 along the path of th longitudinal axis of the second slot 26 parallel to the path of movement of the first slide member 28. The second slide member 34 has a dummy lens abutment 40 located on one end of the second slide member 34. As shown, the dummy lens abutment 40 is formed by one transverse end of the second slide member 34.

A first scale 42 is located on the base member 22 adjacent to and extending along the linear path of movement of the first slide member 28. The first scale 42 is centered on the transverse center of the path of movement of the first slide member 28 and is used to measure the longest horizontal dimension of the lens pattern 10. As shown, the first scale 42 has symmetrically disposed dual segments 44 and 46 having two zero points, one at each end of the first scale 42. Each first scale segment 44 and 46 ascends to a common maximum reading located at the transverse center of the path of movement of the first slide member 28.

The instrument 16 also includes means, generally denoted as the numeral 48, for locating and also retaining a lens pattern at each end of the first slide member 28 with the longest horizontal dimension of the lens pattern 10 in alignment with the path of movement of the first slide member 28. The lens pattern locating and retaining means 48 is shown as comprising a pair of spaced apart locating pins 50 attached to the base member 22 toward each transverse end of the first slide member 28, and projecting upwardly from the top surface of the base member 22. The distance between locating pins 50 of each pair corresponds to the distance between the locating apertures 14 of the lens pattern 10 and are sized and configured to be received in the lens pattern locating apertures 14. The axis between the locating pins 50 is in parallel alignment to the path of movement of the first slide member 28.

The instrument 16 has lens pattern abutment means, generally denoted as the numeral 52, on the base member 22 located to each end of the path of movement of the first slide member 28 and spaced to opposite sides of the lens pattern locating and retaining means 48 from the corresponding transverse abutment ends 33 of the first slide member 28. The lens pattern abutment means 52 is shown as upstanding flanges 54 at both ends of the base member 22 toward the opposite ends of the path of travel of the first slide member 28.

The instrument also has dummy lens abutment means, generally denoted as the number 55, on the base member 22 located at one end of the path of movement of the second slide member 34 adjacent the transverse dummy lens abutment end 40 of the second slide member 34. The dummy lens abutment means 55 is shown as an upstanding flange 57. As shown, the upstanding lens pattern abutment flange 54 and upstanding dummy lens abutment flange 57 are in alignment and can in fact be unitary with each other.

The lens pattern locating and retaining means 48 located between each of the lens pattern abutment ends 33 of the first slide member 28 and the lens pattern abutment flange 54 is movably adjustable in the direction of the path of movement of the first slide member 28 to provide more or less space between the lens pattern abutment flange 54 and the adjacent one of the pair of locating pins 50 so that lens patterns 10 of various sizes can be accomodated. Toward this objective, the lens pattern locating and retaining means 48 includes a slide plate 56 to which the pins 50 are attached, the slide plate 56 being mounted to the base member 22 for movement thereon in the direction of the path of movement of the first slide member 28 toward and away from the lens pattern abutment flange 52. The slide plate 50 is movably mounted to the base member 22 by means of a depending flange 58 which is received in an elongated slot 60 formed in the base member 22. The depending flange 58 includes an enlarged head 62 which abuts the bottom surface of the base member 22 to retain the depending flange 58 in the elongated slot 60. The longitudinal axis of the slot 60 is parallel to the elongated slot 24 in which the first slide member 28 moves.

A second scale 64 is located on the second slide member 34 adjacent to and extending along the linear path of movement of the second slide member 34 and is centered on the transverse center of the second slide member 34. As shown, the second scale 64 has symmetrically disposed dual segments 66 and 68 having two maximum measuring points, one at each end of the second scale 64 and decending toward a common minimum reading at the transverse center of the second slide member 34.

Spectacle frame lens opening engaging means 70 is positioned and affixed on the second slide member 34 proximate the end of the slide member 34 opposite the transverse dummy lens abutment end 40, and similar spectacle frame lens opening engaging means 72 is affixed to the bore member 22 in alignment with the lens opening engagement means 70 along the path of movement of the second slide member 34. As shown, lens opening engagement means 70 and 72 each are an upstanding mushroom shaped pin having a distal end configured to be seated in the groove of the frame lens opening. The lens opening engagement pins 70 and 72 engage the lens opening of the spectacle frame 18 diametrically of the lens opening in the manner of inside calipers.

Index means 73 are located on the first slide member 28 for registering with the first scale 42 to indicate the longest horizontal dimension of the lens pattern 10 positioned at either end of the first slide member 28, and for also registering with the second scale 64 on the second slide member 34 to indicate the lens edger device setting to produce a lens to fit the spectacle lens opening corresponding in shape to the lens pattern 10.

Third scale means 74 is located on the top surface of the base member 22 between the dummy lens abutment flange 57 and transverse dummy lens abutment end of the second slide member 34. The third scale means 74 is in the form of two intersecting series of graduated measurement marks identified by numerals 76 and 77. The horizontal series 76 is used to measure the horizontal dimension of a lens pattern 10 and the vertical series 78 is used to measure the vertical dimension of a lens pattern. In order to properly position a lens pattern over the third scale means 74, a pair of spaced apart locating pins 80 are affixed to the base member 22 projecting upwardly from the top surface of the base member 22. The distance between the locating pins 80 corresponds to the distance between the locating apertures 14 of the lens pattern 10 and are sized and configured to be received in the lens pattern locating apertures 14. The pair of locating pins 80 lay on the horizontal scale series 76 and are centered on the vertical scale series 78.

In operation, to determine the lens edger setting required to make a finished lens to fit a rimmed pair of spectacles, the lens pattern 10 is positioned on the pair of lens pattern locating pins 50 located above the spectacle frame lens opening engagement means 70 and in abutment with the adjacent upstanding lens pattern abutment flange 54, and the first slide member 28 is moved to the right as seen in FIG. 2 until the right hand lens pattern abutment end 33 contacts the lens pattern 10. Next, the rimmed spectacle frame 18 is positioned at the frame engagement pins 70 and 72 with the pins 70 and 72 diametrically contacting the lens opening of the frame. The lens edger setting is then read directly from the second segment of the second scale 64 where in index means 73 registers with the second segment 68 of the second scale 64. The actual longest horizontal dimension of the lens pattern 10 can be read directly from the second segment 46 of the first scale 42 where the index means 73 registers with the second segment 46 of the first scale 42.

The longest horizontal dimension of an existing lens removed from an existing spectacle frame can be determined by placing the lens in the instrument 16 in the position of the lens pattern 10 and reading the dimension from the first scale 42 at the index 73.

To determine the lens setting required to make a finished lens to fit a rimless pair of spectacles, the lens pattern 10 is positioned on the pair of lens pattern pins 50 located above the dummy lens position and in abutment with the adjacent upstanding lens pattern abutment flange 54, and the first slide member 28 is moved to the left as seen in FIG. 2 until the left hand lens pattern abutment end 33 contacts the lens pattern 10. Next, the dummy lens 20 previously removed from the rimless spectacle frame is positioned at the left end of the second slide member 34 and in abutment with the dummy lens abutment flange 57, and the second slide member 34 is moved to the left until the dummy lens abutment end 40 thereof contacts the dummy lens 20. The lens edger setting is then read directly from the first segment 66 of the second scale 64 where the index means 73 registers with the first segment 66 of the second scale 64. The actual longest horizontal dimension of the lens pattern 10 can be read directly from the first segment 44 of the first scale 42 where the index means 73 registers with the first segment 44 of the first scale 42.

To check the accuracy of the lens pattern 10 prior to use in determining the edger device setting, the lens pattern is placed over the third scale means 74 between the dummy lens abutment flange 57 and dummy lens abutment end 40 of the second slide member 34 with the locating pins 80 received in the apertures 14 of the lens pattern 10 thusly properly locating the lens pattern 10 over the third scale means 74. The horizontal and vertical measurements of the lens pattern 10 can then be read where the periphery of the lens pattern 10 crosses the horizontal series of marks 76 and vertical series of marks 78 of the third scale means 74.

The foregoing detailed description is given primarily for clearness of understanding and no unnecessary limitations are to be understood therefrom for modifications will become obvious to those skilled in the art upon this disclosure and can be made without departing from the spirit of the invention and scope of the appended claims.

We claim:

1. An instrument for determining the setting of a lens edger device based upon the relationship between a lens pattern and the lens opening of a spectacle frame or dummy lens, comprising:
    a base member;
    a first slide member having two transverse ends slidably mounted to the base member for linear movement in both longitudinal directions of the first slide member;
    lens pattern abutment means located on each transverse end of the first slide member;
    a first scale on the base member adjacent to and extending along the linear path of movement of the first slide member, the first scale being centered on the transverse center of the path of movement of the first slide member;
    means for both locating and retaining a lens pattern at each end of the first slide member with the longest horizontal dimension of the lens pattern in alignment with the path of movement of the first slide member;
    lens pattern abutment means on the base member located at each end of the path of movement of the first slide member and spaced to the opposite side of the lens pattern locating and retaining means from the corresponding transverse end of the first slide member;

a second slide member having two transverse ends slidably mounted to the base member for linear movement in both longitudinal directions of the second slide member along a path of movement parallel to the path of movement of the first slide member;

a dummy lens abutment located on the second slide member at one transverse end of the second slide member;

dummy lens abutment means on the base member located at the one end of the path of movement of the second slide member;

spectacle frame lens opening engagement means located on the second slide member at the other transverse end of the second slide member for engaging the spectacle frame at one end of the diameter of the lens opening;

spectacle frame lens opening engagement means on the base member for engaging the spectacle frame at the other end of the diameter of the lens opening;

a second scale on the second slide member extending along the linear path of movement of the second slide member, the second scale being centered on the transverse center of the second slide member; and, index means on the first slide member for registering with the first scale to indicate the longest horizontal dimension of the lens pattern positioned at either end of the first slide member and for registering with the second scale on the second slide member to indicate the setting for the lens edger device to produce a lens to fit the spectacle frame openings corresponding in shape to the lens pattern.

2. The instrument of claim 1, wherein the lens pattern locating and retaining means is adjustably movably in the direction of movement of the first slide member.

3. The instrument of claim 1, wherein the first scale comprises symmetrically disposed dual segments having two zero points, one at each end of the first scale, and each scale segment accends to a common maximum reading located at the transverse center of the path of movement of the first slide member.

4. The instrument of claim 1, wherein the second scale comprises symmetrically disposed dual segments having two maximum measuring points, one at each end of the second scale and each scale segment decends to a common minimum reading at the transverse center of the second slide member.

5. The instrument of claim 1, further comprising third scale means located on the base member between the dummy lens abutment means on the base member and the dummy lens abutment located on the second slide member for measuring the horizontal and vertical dimensions of a lens pattern located over the third scale means.

6. The instrument of claim 5, further comprising lens pattern locating means at the third scale means.

* * * * *